United States Patent [19]

Tamba et al.

[11] Patent Number: 4,903,485
[45] Date of Patent: Feb. 27, 1990

[54] MUFFLER COOLING DEVICE FOR V-TYPE ENGINE

[75] Inventors: Shinichi Tamba; Shigeru Nishimura; Akio Miguchi, all of Kobe, Japan

[73] Assignee: Kawasaki Jukugyo Kabushiki Kaisha, Japan

[21] Appl. No.: 281,400

[22] Filed: Dec. 8, 1988

[30] Foreign Application Priority Data

Dec. 10, 1987 [JP] Japan .................... 62-313715

[51] Int. Cl.⁴ .................................................. F01N 3/02
[52] U.S. Cl. ............................................... 60/320; 60/321; 123/41.57; 123/41.6; 123/41.62; 123/41.65
[58] Field of Search .................... 60/323, 321, 320; 123/41.62, 41.6, 41.57, 41.31, 41.65

[56] References Cited

U.S. PATENT DOCUMENTS

| | | | |
|---|---|---|---|
| 2,138,001 | 11/1938 | Fluor | 60/321 |
| 2,585,083 | 2/1920 | Bouvy | 123/41.62 |
| 4,060,985 | 12/1977 | Fukushima | 60/320 |
| 4,608,946 | 9/1986 | Tanaka et al. | 123/2 |

FOREIGN PATENT DOCUMENTS 62-55410 3/1987 Japan .

Primary Examiner—Douglas Hart
Attorney, Agent, or Firm—Leydig, Voit & Mayer

[57] ABSTRACT

A muffler cooling device for a V-type engine which includes an engine cooling fan disposed at an end of a crankshaft. An air guide plate is provided at a part of a duct through which air sucked by the cooling fan flows, and the duct has at least one opening through which the air flows as being guided by the air guide plate. The arrangement is such that the air having flown through the opening is led, through a space surrounded by a V-bank formed by cylinder heads and an intake manifold, to an area in which a muffler and exhaust pipes extending from the cylinder heads to the muffler are arranged.

10 Claims, 2 Drawing Sheets

MUFFLER COOLING DEVICE FOR V-TYPE ENGINE

BACKGROUND OF THE INVENTION

1. Field of the Invention

The present invention relates to a muffler cooling device for a V-type engine used for working machines such as a ride-on type lawn mower or a combine.

2. Description of the Prior Art

A cooling device for cooling a muffler of a V-type engine mounted on a working machine is shown in, for example, Japanese Patent Unexamined Publication No. 62-55410. In the structure shown in this publication, a muffler is horizontally fixed to the front or rear end of a chassis on which a V-type engine is mounted. The muffler has exhaust gas inlets near the left and right ends thereof, and exhaust gas pipes extending from left and right cylinders, respectively, of the engine are connected to the respective exhaust gas inlets of the muffler. Further, in the structure described in this publication, the cooling of the muffler is effected solely by an air flow produced by the travel or running of the working machine.

In a working machine in which a muffler thereof is cooled with the utilization of the air flow produced by the travel of the machine, as in the structure of the abovementioned publication, the cooling of the muffler may be made only during travel of the machine. Thus, in the case where the working machine is of the type travelling at low speed, or of the type operated in a fixed position, the muffler would not be cooled. As a result, there is the fear that the muffler will be abnormally hot, and that an after-burn phenomenon of unburnt gas may result due to heat remaining after the operation of the machine has been stopped.

SUMMARY OF THE INVENTION

Accordingly, it is an object of the invention to provide a muffler cooling device for a V-type engine which is constructed to effectively cool the muffler.

It is another object of the invention to provide a muffler cooling device for a V-type engine which provides effective cooling of a muffler and exhaust pipes connected thereto even when a working machine on which the engine is mounted is not in motion.

In accordance with the invention, a muffler cooling device for a V-type engine which includes an engine cooling fan disposed at an end of a crankshaft comprises: passage means for air sucked by the cooling fan, and means for guiding a part of the air flowing in the passage means to flow from the passage means, through a space surrounded by a V-bank formed by cylinder heads and an intake manifold, to an area in which a muffler and exhaust pipes extending from the cylinder heads to the muffler are arranged.

Preferably, the guiding means includes an air guide plate provided in the passage means. The engine may be a liquid cooled engine having a radiator cooled by the cooling fan. Further, the passage means may include a duct, and in this case the air guide plate may be formed integral with the duct.

The exhaust pipes may be conveniently arranged at a location opposite to the air guide plate with respect to the V-bank. Further, the exhaust pipes may be arranged substantially along a chassis on which the engine is mounted.

According to the invention constructed as described hereinabove, a part of the air flowing in the passage means is led into the space surrounded by the V-bank and the intake manifold and is discharged to the area located opposite to the guiding means with respect to the space. Since a carburetor is located behind the intake manifold and hence the cooling air flow does not blow directly on the carburetor, the carburetor is prevented from being heated even in the case where the temperature of the cooling air is relatively high. The air flow having passed through the space between the V-bank and the intake manifold is blown against the muffler and the exhaust pipes. Further, the air flow which impinges on a chassis on which the engine is mounted is dispersed or diffused to cool the muffler and the exhaust pipes.

The other objects, features and advantages of the invention will become more apparent from the following description with reference to the accompanying drawings.

DETAILED DESCRIPTION OF THE PREFERRED EMBODIMENT

The invention will now be described by way of example with reference to the accompanying drawings.

Figure 1:
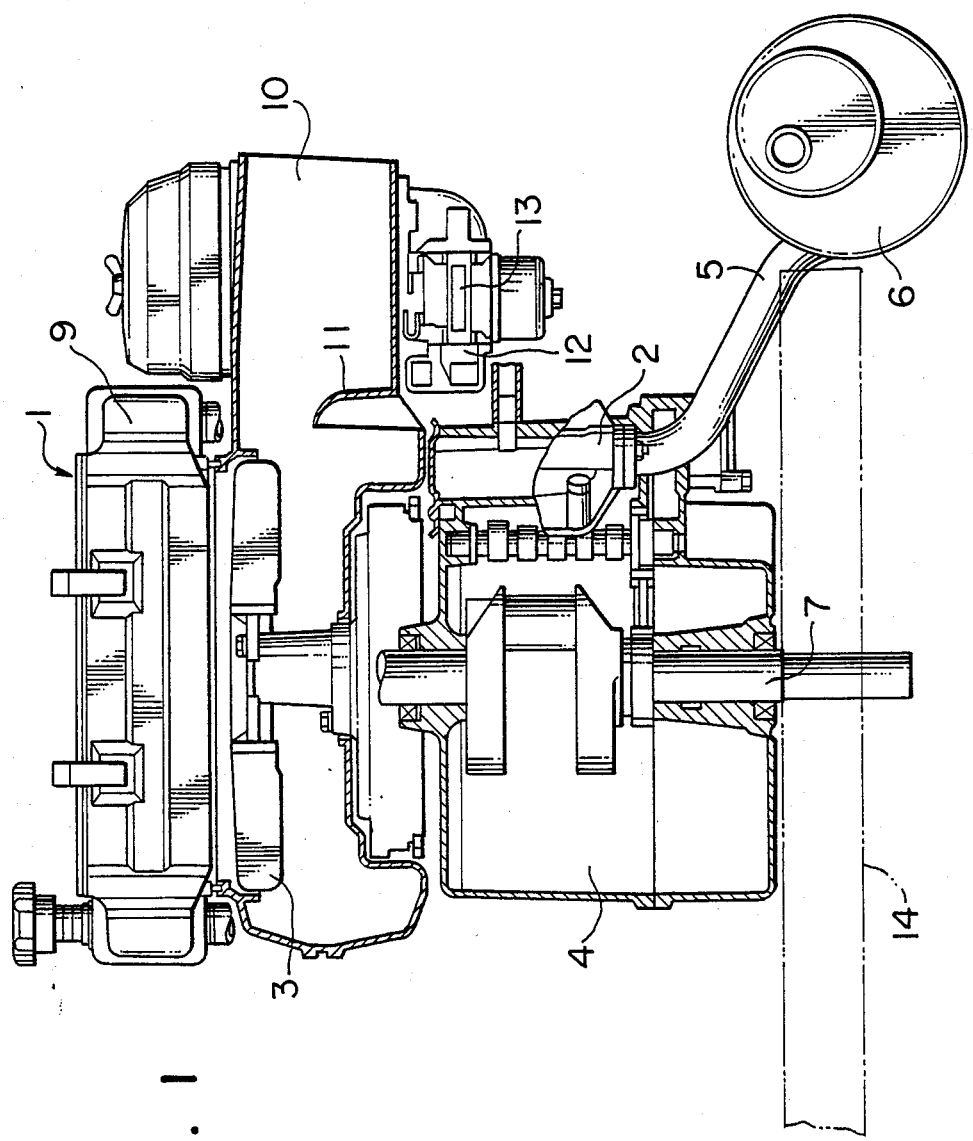
FIG. 1 is a partially fragmentary, longitudinal sectional view of a V-type engine including a muffler cooling device constructed in accordance with an embodiment of the invention.
Figure 2:
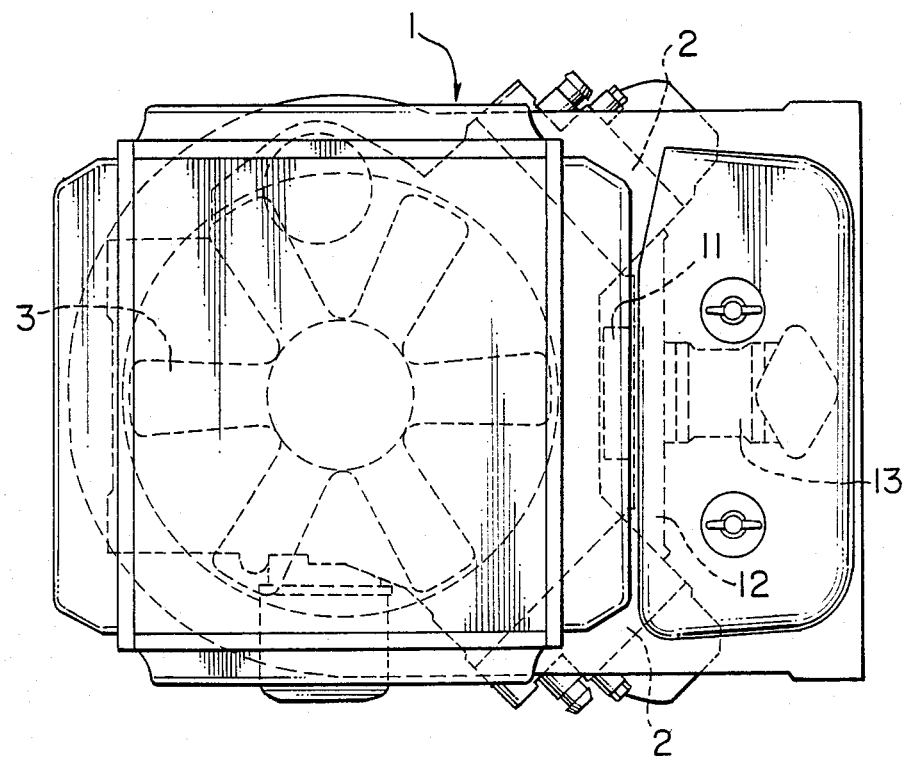
FIG. 2 is a plan view of the engine shown in FIG. 1.

FIG. 1 is a partially fragmentary, longitudinal sectional view showing an engine body 1, and FIG. 2 is a plan view of the engine body shown in FIG. 1. A V-type engine is arranged horizontally as shown in FIG. 2. Cylinder heads 2, 2 are arranged in a V-shape, and an axis of a crankshaft 7 passes through or coincides with a center of a fan 3. Cylinders of the engine are arranged horizontally at the same level as that of a crank compartment 4, though the cylinders are not shown in FIG. 1. Exhaust pipes 5 extend from the cylinder heads 2, 2, one of which is partially fragmentary shown in FIG. 1, and are connected to a muffler 6. The fan 3 is arranged at an end of the crankshaft 7 for cooling a radiator, and air having been sucked by the fan 3 and having passed through the radiator 9 is discharged through a duct 10. An air guide plate 11 is provided at a part of the duct 10, and the duct 10 has at least one opening for leading therethough an air into a space defined between the cylinder heads 2, 2 arranged in a V-shape. An intake manifold 12 is arranged between the cylinder heads 2, 2 to define a space surrounded on three sides. A carburetor 13 is arranged behind the intake manifold 12 and hence air led from the duct, being guided by the air guide plate 11, does not blow directly on the carburetor 13.

The operation of the thus constructed engine will now be described. The engine body 1 is mounted and operated on a chassis 14 indicated by a two-dotted broken line in FIG. 1. A working tool not shown is mounted on a lower end of the crankshaft 7. The fan 3 at the upper end of the crankshaft 7 is rotated together with the crankshaft 7 to suck air from the upper side of the radiator 9 to cool the latter, and the air having passed through the radiator 9 is discharged through the duct 10. Although the air flowing through the duct is heated, the temperature thereof is much lower than the temperature of the engine exhaust gas. Namely, the temperature of the engine exhaust gas in the exhaust pipes 5 is 700° to 800° C., and the temperature at the outer surface of the exhaust pipes 5 is about 450° C. The air branched from the duct 10, being guided by the air guide plate 11, is led downwardly into the space surrounded by the V-bank and the intake manifold 12, and in turn to an area in which the exhaust pipes 5 and the muffler 6 are arranged. Thus, the exhaust pipes 5 and the muffler 6 are cooled by the air. The air flow in the vicinity of the chassis 14 is diffused or dispersed along the chassis 14. During travel or running of the working machine, the muffler 6 and the exhaust pipes 5 are cooled by the air flow caused by the motion of the machine. According to the invention, even in the case where the working machine is not in motion, the muffler and the exhaust pipes are effectively cooled.

As will be apparent from the foregoing description, the muffler cooling device according to the invention includes air guiding means which guides a part of the air flowing in the passage for air sucked in by the cooling fan to flow from the passage into the space surrounded by the intake manifold and the V-bank formed by the cylinder heads of the V-type engine, and the muffler and the exhaust pipes are cooled by the air which has passed through the space. Thus, the muffler and the exhaust pipes may be effectively cooled even when the engine is installed in working machines of low running speed.

Since the muffler is prevented from being excessively heated, the occurrence of a disadvantageous after-burn phenomenon due to unburnt gas may be avoided after operation of the engine has been stopped. Further, since the carburetor is located behind the intake manifold and hence air having passed through the radiator is not led directly to the carburetor, the troubles such as the boiling of fuel in the carburetor may be avoided even when the temperature of the air which has passed through the radiator is relatively high.

We claim:

1. A muffler cooling device for a V-type engine which includes an engine cooling fan disposed at an end of a crankshaft comprising:
   passage means for air sucked by said cooling fan, and
   means for guiding a part of the air flowing in said passage means to flow from said passage means, through a space defined by a V-bank formed by cylinder heads and an intake manifold, to an area in which a muffler and exhaust pipes extending from said cylinder heads to said muffler are arranged.

2. A muffler cooling device according to claim 1, wherein said guiding means includes an air guide plate provided in said passage means.

3. A muffler cooling device according to claim 1, wherein said engine is a liquid cooled engine and said cooling fan is arranged for cooling a radiator of said engine.

4. A muffler cooling device according to claim 1, wherein said passage means includes a duct.

5. A muffler cooling device according to claim 2, wherein said passage means includes a duct and said air guide plate is formed integral with said duct.

6. A muffler cooling device according to claim 2, wherein said exhaust pipes are arranged at a location opposite to said air guide plate with respect to said V-bank.

7. A muffler cooling device according to claim 1, wherein said exhaust pipes are arranged substantially along a chassis on which the engine is mounted.

8. A muffler cooling device according to claim 6, wherein said exhaust pipes are arranged substantially along a chassis on which the engine is mounted.

9. A muffler cooling device according to claim 1 wherein said device is adapted to be used in an engine housing a carburetor located behind said intake manifold.

10. A muffler cooling device according to claim 1 wherein the crankshaft of the V-type engine is oriented vertically.

* * * * *